United States Patent [19]

Possati

[11] 4,139,947
[45] Feb. 20, 1979

[54] APPARATUS FOR CHECKING TAPER

[75] Inventor: Mario Possati, Bologna, Italy

[73] Assignee: Finike Italiana Marposs, S.p.A., Bentivoglio, Italy

[21] Appl. No.: 815,778

[22] Filed: Jul. 14, 1977

[30] Foreign Application Priority Data

Jul. 28, 1976 [IT] Italy .................................. 3514 A/76

[51] Int. Cl.² ........................... G01B 7/30; G01B 5/24
[52] U.S. Cl. .................................... 33/174 E; 33/1 N; 33/174 L; 33/178 E
[58] Field of Search ................. 33/1 N, 169 B, 174 L, 33/174 E, 178 E

[56] References Cited

U.S. PATENT DOCUMENTS

| 2,642,670 | 6/1953 | Dow | 33/174 E |
| 3,602,997 | 9/1971 | Henderson | 33/169 B |
| 3,670,420 | 6/1972 | Kiewicz et al. | 33/169 B |

FOREIGN PATENT DOCUMENTS 477031  9/1951  Canada .................................. 33/174 E

*Primary Examiner*—Richard R. Stearns
*Attorney, Agent, or Firm*—Stevens, Davis, Miller & Mosher

[57] ABSTRACT

An apparatus for measuring taper on mechanical workpieces having a tapered surface, including first and second reference bodies for cooperating with the tapered surface along relevant circumferences of different diameters, a measuring transducer for providing indications responsive to the position of the first and second reference bodies, a support for the first and second reference bodies and first and second connectors connecting the first and second reference bodies, respectively, to the support. The first and second reference bodies define a first revolutionary surface and a second revolutionary surface, the revolutionary surfaces being coaxial between each other and adapted to be arranged tangent to the tapered surface and passing, respectively, through a relevant circumference of the tapered surface. The first and second connectors permit mutual displacement of the first and second reference bodies along the axis of the revolution surfaces and further mutual displacements substantially parallel to a plane perpendicular to said axis.

7 Claims, 2 Drawing Figures

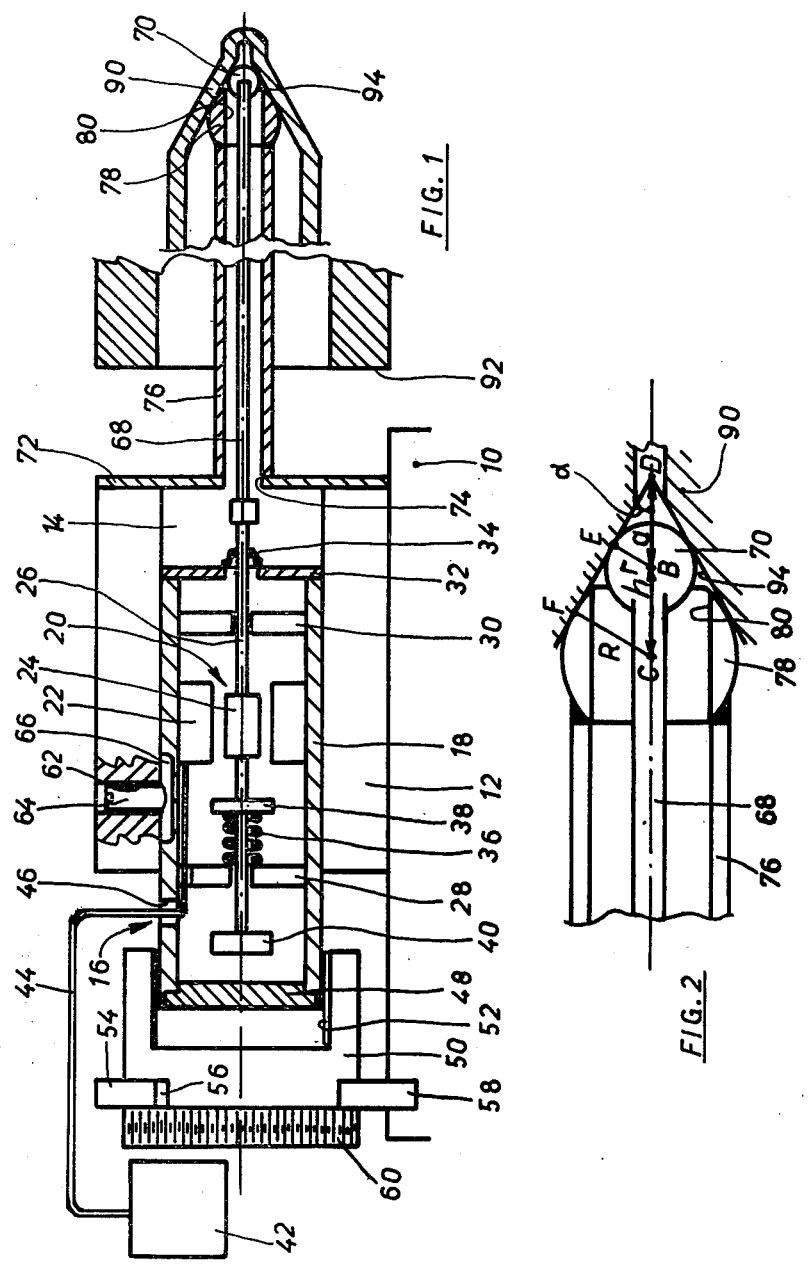

APPARATUS FOR CHECKING TAPER

The present invention relates to an apparatus for checking the taper of the tapered surface of a workpiece with first and second reference means adapted to cooperate with the tapered surface along relevant circumferences of different diameters and with measuring means adapted to provide indications responsive to the position of the first and second reference means.

The known apparatuses for measuring the taper of internal surfaces generally comprise a case, which also has a taper shape, wherein two pairs of radially movable sensing contacts are arranged, and placed on two transversal planes and at a known distance. The contacts of each pair are diametrally opposite with respect to the case axis and they touch the surface to be measured at points which are substantially opposite with respect to the surface axis. Each of the contacts is connected to an associated measuring head, or each pair is connected to a relevant measuring head.

The taper value is obtained by processing the signals supplied by the measuring heads.

The gauges of this type are unusable when the diameter of the cross section of the taper surface in the measurement planes is smaller than a certain value, approx. 10 mm, and least of all when the taper surface is not near the face of the workpiece but it is at the end of a long cylinder bore.

The reason being that the dimensions of the fingers which connect the sensing contacts to the arm-sets of the measuring heads cannot fall below certain values and that too long fingers would be subject to deformations by bending stress and so provide unreliable measurement values.

This situation will take place, for example, when measuring the taper of the end surface of an injector body of a Diesel engine; the typical end surface is that of a truncated cone and the distance of the bases is less than 2 mm, the diameter of the bases is within 1 and 3 mm and it is at 40 mm ca.distance from the body outer face.

It is also known to manually measure the taper ofsurfaces of this type on a bench, by clamping the workpiece to a bracket so that the axis of the taper surface is perpendicular to a bracket reference plane, then a small sphere of a suitable diameter is inserted until it rests on the taper surface, then by means of a gauge the penetration depht is measured; thereafter this operation is repeated by using a sphere of a different diameter. According to the radius of the spheres and depending on the penetration depths, it will be possible to calculate the taper value.

This measuring procedure, apart from requiring considerable time, should be performed by a skilled operator; thus it results in being rather expensive if it has to be repeated for several workpieces, for example, in order to select them.

An object of the present invention is to provide an apparatus for the measurement of taper which measures very rapidly, supplies a direct indication of the taper, may be used by non skilled operators and is rugged, accurate and inexpensive.

Another object is to provide an apparatus for the measurement of taper that is suitable to gauge taper of internal surfaces whose transversal sections have very small diameters, less than 10 mm, or that are distant from the workpiece face, because, for example, they are at the end of a bore.

These are other objects which will be outlined in the following description are achieved by an apparatus for checking the taper of the tapered surface of a workpiece with first and second reference means adapted to cooperate with the tapered surface along relevant circumferences of different diameters and with measurement means adapted to provide indications responsive to the position of the first and second reference means, the apparatus including, according to the invention, a support for said first and second reference means; and first and second connection means for connecting said first and second reference means, respectively, to the support; the first and second reference means defining a first revolution surface and a second revolution surface, the revolution surfaces being coaxial between each other, tangent to the tapered surface and passing, respectively, through relevant circumferences; the first and second connection means permitting mutual displacement of the first and second reference means along the axis of said revolution surfaces and further mutual displacements substantially parallel to a plane perpendicular to said axis; said measurement means being adapted to provide indications responsive to said mutual displacements of the first and second reference means along said axis.

The invention will be described in further detail with reference to the accompaying sheet of drawings, which are given solely by way of illustration and not of limitation, and in which:

FIG. 1 is a side view partially in section, of a preferred embodiment of an apparatus for measuring the taper of internal tapered surfaces;

FIG. 2 is a longitudinal enlarged section of part of the apparatus of FIG. 1.

Referring to FIG. 1, the apparatus comprises a support 10 which carries a body 12. The body 12 has a recess 14 wherein a measuring head 16 is located. Head 16 has a protection and support shell 18, having substantially a cylindrical shape, housed with slight play within recess 14. Within the shell there is contained a measurement transducer 20 of the differential transformer type formed by electric windings 22 fixed to shell 18 and by a movable set comprising a core 24 carried by shaft 26. Shaft 26 slides within two bushings 28, 30 fixed to shell 18; the shaft protrudes from one end of the shell passing through a drilled plate 32 and an elastic sealtight gasket 34.

Shaft 26 is urged towards the outside by a spring 36 placed between bushing 28 and a stop ring 38 fixed to the shaft; a stop ring 40 mounted at the internal end of the shaft restricts the movement caused by spring 36.

The windings 22 are connected to an electric power supply, processing and indication unit 42 by means of conductors 44 which go out of shell 18 by passing through a hole 46. The second end of the shell 18 is closed by a cover 48; the end part of the shell is threaded externally and is matched to a bushing 50 which has a threaded recess 52.

A fork plate 54 is inserted within a groove 56 obtained in bushing 50 and its ends 58 are fixed to support 10; the cylindrical external surface of the terminal part 60 of bushing 50 is knurled so it can be easily handturned.

In the upper part of body 12 there is a threaded hole 62 wherein a dowel 64 is screwed; the end of the dowel penetrates into a longitudinal groove 66 obtained in shell 18. A wire 68 for springs is welded to the external end of shaft 26, so that the wire is aligned to the shaft; a spheric body 70 is welded to the free end of wire 68. The section of wire 68 is such that the wire is flexible but inextensible.

A plate 72 with a central bore 74 is fixed to body 12; a tube 76 is welded to plate 72 around hole 74 and a spheric body 78 is welded to the tube end; body 78 has a hole 80 aligned to the tube.

The diameters of the bores 74 and 80, just like the inside diameter of tube 76, are substantially the same and only slightly larger than the diameter of the spheric body 70.

As it may be seen in the figures, wire 68 is internal and coaxial with respect to tube 76 and the spheric body 70 projects out of the spheric body 78; for each relative position of the two spheric bodies there is a definite taper surface which is tangent to both the bodies along relevant circumferences.

A workpiece 90, consisting of an injector body for Diesel engines is shown in the measuring position.

To save space, the body hasn't been shown in its full lenght; the distance between the front surface 92 and the end taper surface to be checked 94 is considerably longer than what it appears to be in the figures, and this also applies to the length of tube 76 and to that of wire 68.

FIG. 2 shows the measuring principle: the spheric bodies 70 and 78 are both in contact with the truncated cone surface 94 of a workpiece 90, along relevant circumferences.

The radii of the spheric surfaces of bodies 70, 78 are r and R respectively and the distance of centers B, C of the two bodies is h; the distance of center B from apex D of the taper surface 94 is a; E and F are two contact points of the surfaces of the two bodies with surface 94 in a longitudinal section plane.

As the angle DÊB of triangle DEB is a 90 degrees angle, and by naming α the angle BDE of the same triangle, it is:

$$\sin\alpha = r/a \quad (1)$$

As the triangles DEB and DFC are similar, it is also possible to write this proportion between the corresponding sides:

$a/r = (a + h)/R$ from which, by obtaining a:

$a = h\, r/(R - r)$ and by substituting the value now obtained of a in (1):

$$\sin\alpha = (R - r)/h \quad (2)$$

It results that sinα is inversely proportional to distance h; for the one-to-one relation from 0° to 90°, which relates an angle to the value of its sine, it is obvious that the value of the angle 2α at the vertex of the taper surface may easily be obtained.

The operation of the gauge is the following: in absence of workpieces to be checked, spring 36 urges the shaft 26 towards the outside (to the right in FIG. 1) till ring 40 touches bushing 28; thus the spheric body 70 reaches its limit position the farthest away from the spheric body 78. The two bodies 70, 78 define a taper surface tangent to both; as distance h being between the centers of the bodies is then the max that may be reached, thus it is determined for pre-established values of R, r the min amplitude of the angle at vertex 2α of the taper surface tangent to the two bodies 70, 78.

By applying a suitable pressure on the spheric body 70 in the direction of the axis of tube 76, shaft 26 is pushed to the inside (towards left in the figure) till spring 36 is totally compressed; consequently the spheric body 70 reaches its limit position being the closest to spheric body 78. Distance h between the centers of the bodies is now the min that may be reached and the angle at vertex 2α of the tangent taper surface the widest that can be measured with the pre-established values of R and r.

The values of r and R and thus the nominal value of h are chosen depending on the nominal value of the angle at vertex 2α of the taper surface and on the diameter of the two cross sections of the surface on which it is wished that contact between the two spheric bodies takes place.

It is advisable that the values of r and R be such that the value of h be intermediate between the two limit values mentioned above. Once these values have been chosen it is necessary to proceed with the manufacture and assembly of the various elements (spheric bodies, wire, tube . . .).

For example, to measure the taper of surface 94 of an injector body whose vertex angle 2α has the nominal value of 60°, a gauge has been manufactured in which the values of r and R are respectively 1.5 and 3 mm, distance h, for a nominal taper, is of 1.5 mm, the diameter of bore 80 is of 2 mm, the diameter of wire 68 is of 0.6 mm and the lenght of the wire is of 50 mm.

After having fixed tube 76 to body 12, head 16, to whose shaft 26 is already welded wire 68 with spheric body 70, is entered in recess 14; dowel 64 is then screwed so that its end enters groove 66 in such a way as to prevent rotation of head 16 while letting it be free to slide in a longitudinal direction.

Head 16 is inserted till body 70 protrudes from bore 80, then bushing 50 is screwed further on the end of shell 18 and the fork plate 54 is inserted in groove 56 and fixed to support 10.

The gauge may either operate in manual or in automatic way; in the first case workpiece 90 is picked up by the operator and pushed to the measuring position, shown in FIG. 1.

If the pressure that the operator applies to the workpiece is substantially in the direction of the tube 76 axis, the workpiece will automatically settle so that the contact between the spheric body 78 and surface 94 occurs along a circumference. At the same time the spheric body 70 is pressed by the workpiece and pushed towards body 78; the force that is applied to body 70 is sufficient to overcome the thrust of spring 36, regardless of the force which keeps workpiece 90 pressed against spheric body 78.

The dimensions of spring 36 and those of the steel wire 68 are chosen so that the force necessary to compress the spring is considerably smaller than the force required to bend the wire. Therefore there is the certainty that the wire remains substantially straight when measurement is taken.

In order to zero set the gauge, a master piece is inserted onto tube 76 and kept pressed so that the taper surface 94 contacts the body 78 along a circumference.

By rotating bushing 50 it is possible to move head 16 forward or backward till it sets itself in a position like the one shown in FIG. 1, when core 24 is in a central position with respect to windings 22 and thus the value of the output signal of the transducer is zero or very close to zero.

Bushing 50 cannot move in the direction of shaft 26, therefore its rotation causes a movement of shell 18, which is unable to rotate since dowel 64 is inserted in groove 66, along the direction of shaft 26. Indication that position shown in FIG. 1 has been reached is displayed by readout meter comprised in unit 42; when the needle is in the central zero position, rotation of bushing 50 is stopped and dowel 64 is turned till it goes no further, thus clamping shell 18 with respect to body 12.

The accuracy that is obtained by the movement of the shell isn't too precise; a fine zero setting is effected electrically by using potentiometers which have control knobs placed beside the readout meter of unit 42.

Now the gauge is ready to measure the workpieces; this operation consists in inserting the injector body on tube 76 till the end taper surface 94 meets body 70, pushes it towards body 78 and rests against it. The absolute value of the signal supplied by transducer 20 is proportional to the difference between the present distance of bodies 70, 78 and the disstance that they had when the master piece was inserted.

The signal phase, which determines the direction of movement of the meter needle to one or to the other side from the central zero position, indicates that the vertex angle of the taper surface is bigger or smaller than the nominal angle and it depends on the fact that body 70, and thus also core 24, is shifted from its central position towards one or the other of the two limit positions above stated.

On the meter scale the values of vertex angle $2\alpha$ can be directly displayed instead of displaying the $\sin\alpha$ values. Of course, in this case the meter scale or the meter drive are not linear.

In the manufactured gauge, having the values of r, R and the nominal value of h previously indicated and with a nominal vertex angle of 60°, the sensitivity is approx 12′ of the angle per 5 microns of variation of h distance, and since the repeatability of head 16 used is of 0.3 to 0.4 microns, as a result it is possible to appreciate taper errors of 1′ approx. Connection of the spheric body 70 to shaft 26 by means of a steel wire 68 enables the center of body 70 to perform small movements substantially in a plane perpendicular to the axis of tube 76 upto a distance of the axis being equal to the radial play of wire 68 or of body 70 with respect to tube 76 or to body 78.

This characteristic is very important as it avoids positioning problems and will always guarantee measurement accuracy. In fact should body 70 be unable to move transversally around the axis of tube 76, as would happen if connection wire 68 were rigid, but it being only able to move in the axis direction, a correct measurement would only be obtained when the axis of the tapered surface 94 is exactly aligned to the tube axis. In this case the centers of the two bodies 70, 78 are located on the axis of the taper surface. Therefore the contact between the same bodies and the surface takes place along two relevant circumferences and the geometric relationships made before with reference to FIG. 2 remain valid.

On the contrary, due to inaccurate positioning of the workpiece, should the axis of the taper surface be misaligned with the tube axis, only one of the two centers of bodies 70, 78 can lie on the taper surface axis; therefore the surface of the other body whose center does not lie on the taper surface axis, contacts the same taper surface in a single point instead of along a circumference and thus the geometric relationship of above is no longer valid and the measurement result is unreliable.

It is clear that the use of an elastic wire 68 in the transversal direction will ensure considerable savings in time and cost, both in the case of measurements carried out in a completely automatic way, because an absolute positioning accuracy is not required, and also in the case of measurements carried out manually, because it is possible not to employ a particularly diligent and experienced operator.

The possible moving away of body 70 from the tube 76 axis and the bending of wire 68 do not cause significant measurement errors, as it has been experimentally proved, because the consequent axial displacements are of a range in magnitude smaller with respect to the radial displacements which caused them.

Measurement operation may easily be automated by providing the apparatus with a device which picks up the workpieces from a loader, urges them towards the apparatus and after measurement has been taken deposits them in an outlet shute. The device carrying the workpieces and urging them towards the apparatus will float, in order to ensure that each workpiece may settle itself with respect to the spheric body 78 and in this manner guarantee that contact between the latter and the taper surface 94 occurs along a circumference.

As a variant a floating connection may be utilized between the shell 12 and the support 10.

A possible modification of the apparatus consists in utilizing a rigid shaft instead of flexible wire 68 and in coupling the spheric body 70 so that the center of body 70 may move transversally in a plane perpendicular to the shaft axis. This coupling may be effected by fixing a small disk at the end of rigid shaft, with the disk faces being perpendicular to the shaft axis, and in inserting the disk into a suitable (disk shaped) recess of the spheric body; the recess radius will be longer than the disk radius, so that there is play between the side surface of the disk and that of the recess.

The spheric body may settle with respect to the taper surface 94, by moving transversally, through a sliding of the recess faces with respect to those of the disk. To the contrary the spheric body fully transmits the vertical displacements to the rigid shaft.

Another coupling may be made by rigidly fixing spheric body 70 to a short axial pin and coupling the other end of the pin to the rigid shaft end through a spheric joint which allows the pin, and also body 70, to rotate round the shaft end.

Also with this structure, body 70 transmits just the axial movements to the shaft, but remains free to settle itself with respect to the taper surface 94 by effecting transversal displacements allowed by the spheric joint.

Unit 42 can include circuits which, depending on the value of each measurement, control output devices that select the workpieces into different classes.

According to a further possible modification the spheric body 70 is stationary by being coupled to support 10 while spheric body 78 moves axially by being coupled to the moving set of the measuring head. In this way the tapered surface 94 rests on stationary body 70, pushing body 78 and moving it away from body 70. The measurement signal has the same value and therefore unit 42 need not be modified.

The apparatus may be modified for checking external taper surfaces. To this purpose bodies 70, 78 are replaced by elements defining two revolution surfaces coaxial between each other and tangent to the tapered surface to be checked.

For example it is possible to employ two terns of spherical contacts the first of which is arranged inside tube 76 and the second of which is arranged at the outside of a hollow member coupled to the end of wires 68. The length of wire 68 will be such that the second tern of contacts cooperates with a section of the tapered surface having diameter 2r while the first tern cooperates with a section having diameter 2R ( r < R).

The contacts of each tern are arranged at 120° from one another.

It is evident that further additions or changes of parts may be carried out without going out of the scope of the invention.

What is claimed is:

1. An apparatus for checking the taper of the tapered conical surface of a workpiece, said tapered surface defining a geometrical axis, comprising:

support means;

first mechanical reference means carried by the support means for contacting the tapered surface, substantially along a first circumference of said surface;

second mechanical reference means carried by the support means for contacting the tapered surface, substantially along a second circumference of said surface;

first connection means coupled to said support means and carrying said first mechanical reference means, the first connection means being adapted to permit displacements of the first mechanical reference means in directions substantially perpendicular to said geometrical axis;

second connection means coupled to said support means and carrying the second mechanical reference means, wherein one of the first and second connection means is movable with respect to the support means to permit displacements of the relevant carried mechanical reference means in a direction substantially parallel to said geometrical axis; and checking means coupled to said support means and to said one of the first and second connection means for providing a measurement signal responsive to said displacements in the direction substantially parallel to the geometrical axis.

2. An apparatus for checking the taper of the tapered conical surface of a workpiece, said tapered surface defining a geometrical axis, comprising:

a support; measuring head means carried by the support and including a support shell;

a first mechanical reference member fixedly coupled to the support shell and having a shape adapted to define a substantially circular cooperation zone with the tapered surface;

a transducer including detecting means fixed to the support shell and a movable element, the detecting means providing a signal responsive to the position of the movable element;

movable means guided for movement in the support shell and carrying the movable element of the transducer;

a second mechanical reference member carried by said movable means for contacting the tapered surface, substantially along a circumference of the tapered surface, the movable means and the second reference member being arranged to permit movement of the second reference member in an axial direction substantially parallel, upon arrangement of the apparatus in its proper measuring position, to said geometrical axis;

thrust means biasing the movable means in said axial direction;

wherein said movable means includes connection means for permitting displacements of the second reference member in directions substantially perpendicular to said axial direction, to assure cooperation of said second reference member with the tapered surface substantially along said circumference.

3. An apparatus for checking the taper of the tapered conical surface of a workpiece, said tapered surface defining a geometrical axis, comprising:

a support;

measuring head means carried by the support, the measuring means including:

a support shell;

a first mechanical reference member fixedly coupled to the support shell and having a rounded peripheral surface for contacting the tapered surface substantially along a first circumference of the tapered surface;

a transducer including circuit means arranged in the support shell and a movable element, the circuit means providing a signal responsive to the position of the movable element;

movable means guided for movement in the support shell and carrying the movable element of the transducer; a second mechanical reference member carried by said movable means and having a rounded peripheral surface for contacting the tapered surface, substantially along a second circumference of the tapered surface, the movable means and the second mechanical reference member being arranged to permit movement of the second mechanical reference member in an axial direction substantially parallel, upon arrangement of the apparatus in its proper measuring position, to said geometrical axis;

thrust means thrusting the movable means in said axial direction;

wherein said movable means includes linking means arranged between said transducer movable element and said second mechanical reference member, the linking means permitting displacements of the second mechanical reference member in directions substantially perpendicular to said axial direction, to assure the contact of the second reference member with the tapered surface substantially along said second circumference.

4. An apparatus for checking the taper of the tapered conical surface of a workpiece, said tapered surface defining a geometrical axis, comprising:

a support;

measuring head means carried by the support and including:

a support shell; a tubular member having a first end and a second end, the first end being mounted on the support shell;

a first mechanical reference member fixed at the second end of said tubular member and having a rounded peripheral surface for contacting the tapered surface substantially along a first circumference of the tapered surface;

a transducer including circuit means arranged in the support shell and a movable element, the circuit means providing a signal responsive to the position of the movable element;

a shaft guided for axial movement in the support shell, the shaft carrying the movable element of the transducer;

a flexible wire having one of its ends coupled to said shaft, the wire being arranged to have its other end movable, upon bending of the wire, in directions substantially perpendicular to the direction of said axial movement, at least part of the wire being located within said tubular member;

a second mechanical reference member coupled to said other end of said flexible wire and having a rounded peripheral surface for contacting the tapered surface substantially along a second circumference of the tapered surface;

spring means for thrusting said shaft, flexible wire and second mechanical reference member in said direction of axial movement, the thrust provided by the spring means being smaller than the force required to bend the wire to prevent undesired bending of the wire when checking a tapered surface coaxial with said tubular member.

5. An apparatus for checking the taper of the tapered conical surface of a workpiece, said tapered surface defining a geometrical axis, comprising:

a support;

a body mounted on said support;

a tubular member having a first end and a second end, the first end being fixed to said body;

a first mechanical reference member fixed at the second end of said tubular member and having a rounded peripheral surface for contacting the tapered surface along a first circumference of the tapered surface;

a measuring head adjustably housed in said body and including:

a support shell;

a transducer including circuit means arranged in the support shell and a movable element, the circuit means providing a signal responsive to the position of the movable element;

a shaft guided for axial movement in the support shell, the shaft carrying the movable element of the transducer;

a flexible wire having one of its two ends coupled to said shaft, the wire being located, at least in part, within said tubular member and being arranged to have its other end movable, upon bending of the wire, in directions substantially perpendicular to the direction of said axial movement;

a second mechanical reference member coupled to said other end of the flexible wire and having a rounded peripheral surface for contacting the tapered surface substantially along a second circumference of the tapered surface;

spring means for biassing said shaft, flexible wire and second mechanical reference member in said direction of axial movement, the bias provided by the spring means being smaller than the force required to bend the wire; and adjusting and locking means coupled to said support and measuring head for adjusting the measuring head in said body along the direction of said axial movement and for locking the measuring head.

6. An apparatus according to claim 5, for checking the taper of an internal surface, wherein said second mechanical reference member comprises a spheric body and said first mechanical reference member comprises a substantially spheric body defining a hole being coaxial with said tubular member.

7. An apparatus according to claim 6, for checking the taper of the body of an injector for Diesel engines defining a bore with a terminal tapered surface, wherein said spheric bodies have diameters for permitting the bodies to contact the terminal tapered surface of the injector body, the tubular member and the wire having lengths for permitting the insertion of the spheric bodies into the bore of the injector body for contacting the terminal tapered surface.

* * * * *